United States Patent [19]

De Buhr et al.

[11] Patent Number: 4,821,495
[45] Date of Patent: Apr. 18, 1989

[54] BLOWER AND DISCHARGE SPOUT ASSEMBLY

[75] Inventors: Harold E. De Buhr; Raymond S. Wilkes, Both of Ottumwa, Iowa

[73] Assignee: Deere & Company, Moline, Ill.

[21] Appl. No.: 29,109

[22] Filed: Mar. 23, 1987

[51] Int. Cl.⁴ ............................................. A01D 87/10
[52] U.S. Cl. ..................................... 56/13.3; 56/16.6; 406/100
[58] Field of Search ....................... 56/13.3, 12.8, 16.6; 130/27 HF; 406/71, 100, 101, 102, 193, 195

[56] References Cited

U.S. PATENT DOCUMENTS 747,987 12/1903 Lee ...................................... 406/100

FOREIGN PATENT DOCUMENTS 2556398 6/1977 Fed. Rep. of Germany ....... 56/13.3

Primary Examiner—Paul J. Hirsch

[57] ABSTRACT

An ensilage harvester blower is provided with a deflector which directs crop material discharged from the blower along a path which intersects a curved, crop direction changing, discharge spout wall surface area at a shallow angle so as to minimize the normal forces exerted by the discharged material on the wall surface area.

2 Claims, 1 Drawing Sheet

BLOWER AND DISCHARGE SPOUT ASSEMBLY

BACKGROUND OF THE INVENTION

The present invention relates to ensilage harvesters and more particularly relates to blower and discharge spout assemblies for such harvesters.

Wear of blower and discharge spout surfaces is a longstanding problem on forage harvesters. Wear on the spout is concentrated in areas where crop material impinges and changes direction when introduced into the spout by the blower. Failure of the spout in these localized areas often necessitates replacement of an entire spout component.

SUMMARY OF THE INVENTION

According to the present invention there is provided an improved blower and discharge spout combination.

An object of the invention is to provide a blower and discharge spout combination wherein the impingement on the discharge spout of material discharged from the blower is minimized.

A more specific object of the invention is to provide a blower and discharge spout combination wherein the blower is designed to direct crop material toward a curved spout surface so that the material engages the surface at a small angle so that the material flows or slides with a low normal force.

These and other objects, features and advantages of the present invention will become apparent to those skilled in the art from the description which follows and from the drawings.

DESCRIPTION OF THE PREFERRED EMBODIMENT

Figure 1:
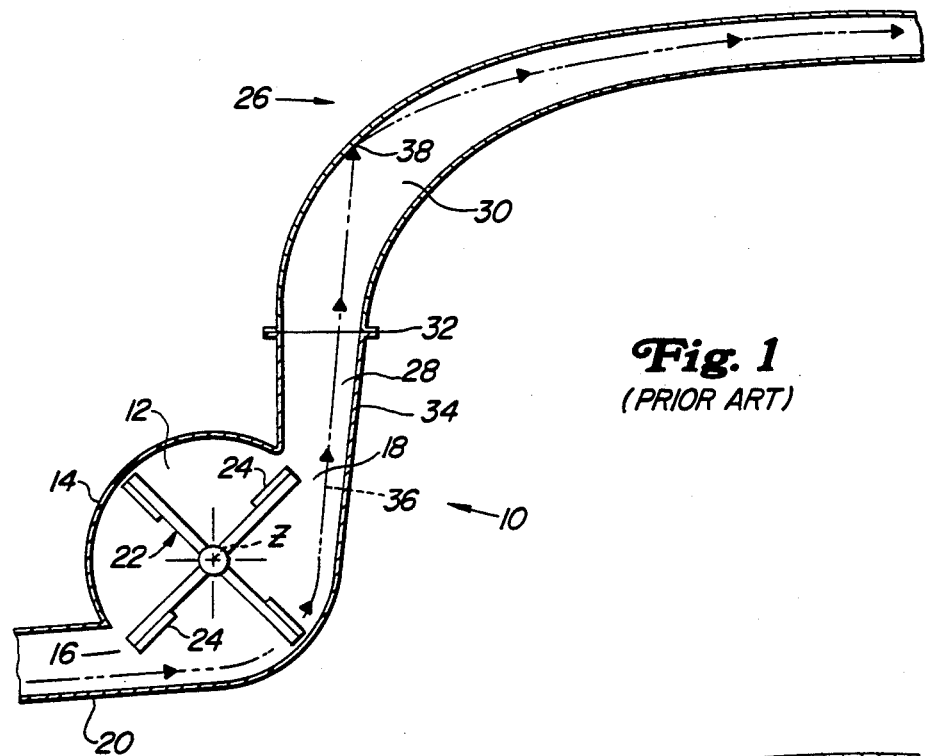
FIG. 1 is a schematic side elevational view of a blower and discharge spout assembly showing a typical prior art design.

Referring now to FIG. 1, there is shown a blower and discharge spout assembly 10 which is representative of the prior art. Specifically, the assembly 10 includes a blower housing 12 including a cylindrical wall 14 having inlet and discharge openings 16 and 18 respectively opening horizontally and vertically and formed substantially one hundred eighty degrees apart within lower left and upper right quadrants of the housing, as viewed in FIG. 1. Provided in the housing 12 for receiving crop material delivered to the inlet opening 16 via a substantially horizontal conduit 20 and discharging the material through the opening 18 is an impeller 22 supported, by bearings (not shown) located in opposite end walls of the housing 12, for rotation about an axis Z and including a plurality of blades or paddles 24 having radially outer ends disposed close to the cylindrical wall 14.

A discharge spout 26 is coupled to the housing wall 14 for conveying crop material upwardly and away from the discharge opening 18 and includes a relatively straight first section 28 and an arcuately curved second section or elbow 30 interconnected at a joint 32. Specifically, the first section 28 is oriented at a slight angle from the vertical and includes a right wall 34 extending substantially tangentially to the housing wall 14 and to an inner arcuate wall surface of the elbow 30. Crop material discharged into the spout section 28 by the impeller 22 follows a path 36 that parallels the wall 34 and intersects an arcuately curved, leftward wall surface area 38 of an outer arcuate wall surface of the second spout section or elbow 30 at a relatively steep angle. Thus, the spout surface area 38 will become worn due to the force of material impinging thereagainst.

Figure 2:
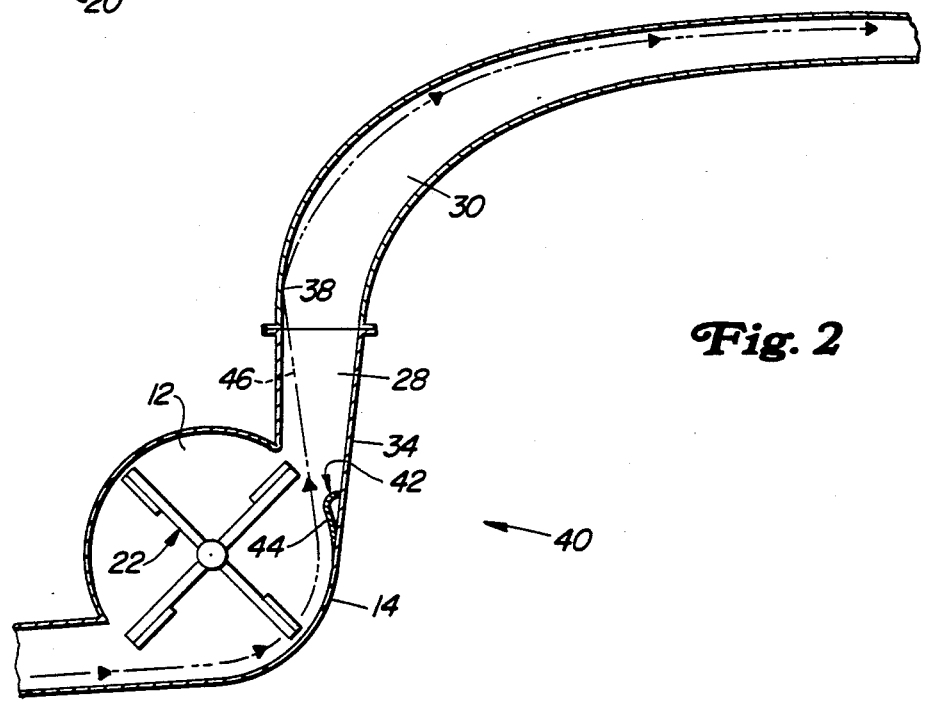
FIG. 2 is a schematic side elevational view of a blower and discharge spout assembly designed in accordance with the principles of the present invention.

Referring now to FIG. 2, there is shown a blower and discharge spout assembly 40 which is constructed in most respects like the previously described assembly 10 and is given like reference numerals. Specifically, the assembly 40 includes the impeller or blower 22, housing 12 and discharge spout sections 28 and 30.

The assembly 40 differs from the assembly 10 in that in the vicinity of where the spout section wall 34 joins the housing wall 14, there is provided a blower deflector 42 which extends transversely across and is joined to the wall 34 and the ends of the housing 12. The deflector 42 includes an arcuate wall 44 which forms a short extension of the inner surface of the cylindrical wall 14. The deflector 42 modifies the trajectory of crop material leaving the housing from that described above relative to FIG. 1 so that the material travels along a path 46 that diverges from the wall 34 and intersects the surface area 38 at a very shallow angle, and, in fact, is substantially tangential to a beginning end of the elbow outer arcuate wall surface that includes the arcuately curved surface area 38.

Thus, crop material passing through the discharge spout section 28 flows smoothly along the curvature of outer arcuate wall surface the discharge spout section or elbow 30.

We claim:

1. In an ensilage harvester blower and discharge spout assembly including a blower housing having a cylindrical wall, a blower blade assembly rotatably mounted in the housing and having blades with radially outer ends disposed in close proximity to the wall, the housing including, as viewed from an end thereof, an inlet opening formed in a lower quadrant thereof and an outlet opening formed in an upper quadrant thereof spaced approximately one hundred eighty degrees from the inlet opening, and a discharge spout coupled to the housing for receiving crop material discharged from the housing through said outlet opening and having a first spout section extending upwardly from the housing and coupled to an arcuately curved second spout section having inner and outer arcuate wall surfaces with a first wall portion of the first spout section extending substantially tangentially to the housing and inner arcuate wall surface, the improvement comprising: said blower housing having a deflector mounted transversely thereacross and being joined to the first wall portion tangentially to and including an arcuate surface forming a continuation of the cylindrical wall of the housing and located for directing crop material discharged through said outlet opening along a path which intersects a surface area of the outer arcuate wall surface of the second spout section at a small angle.

2. In an ensilage harvester blower and discharge spout assembly including a blower housing having a cylindrical wall containing inlet and outlet openings spaced approximately one hundred eighty degrees apart and respectively opening horizontally and vertically, a fan assembly rotatably mounted in the housing and having blades with radially outer ends disposed in close proximity to the wall, and a discharge spout coupled to the housing for receiving crop material discharged through the outlet opening and having an arcuately curved elbow spaced above the outlet opening and including inner and outer arcuate wall surfaces, and a first spout section joined to the housing and elbow and including a first wall portion extending substantially tangentially to the housing and inner arcuate wall surface, the improvement comprising: a deflector connected to the first wall portion and including a surface forming a continuation of the cylindrical wall of the housing located for directing crop discharged through the outlet opening along a path which is approximately tangential to the outer arcuate wall surface of the elbow.

* * * * *